United States Patent Office 3,425,648
Patented Feb. 4, 1969

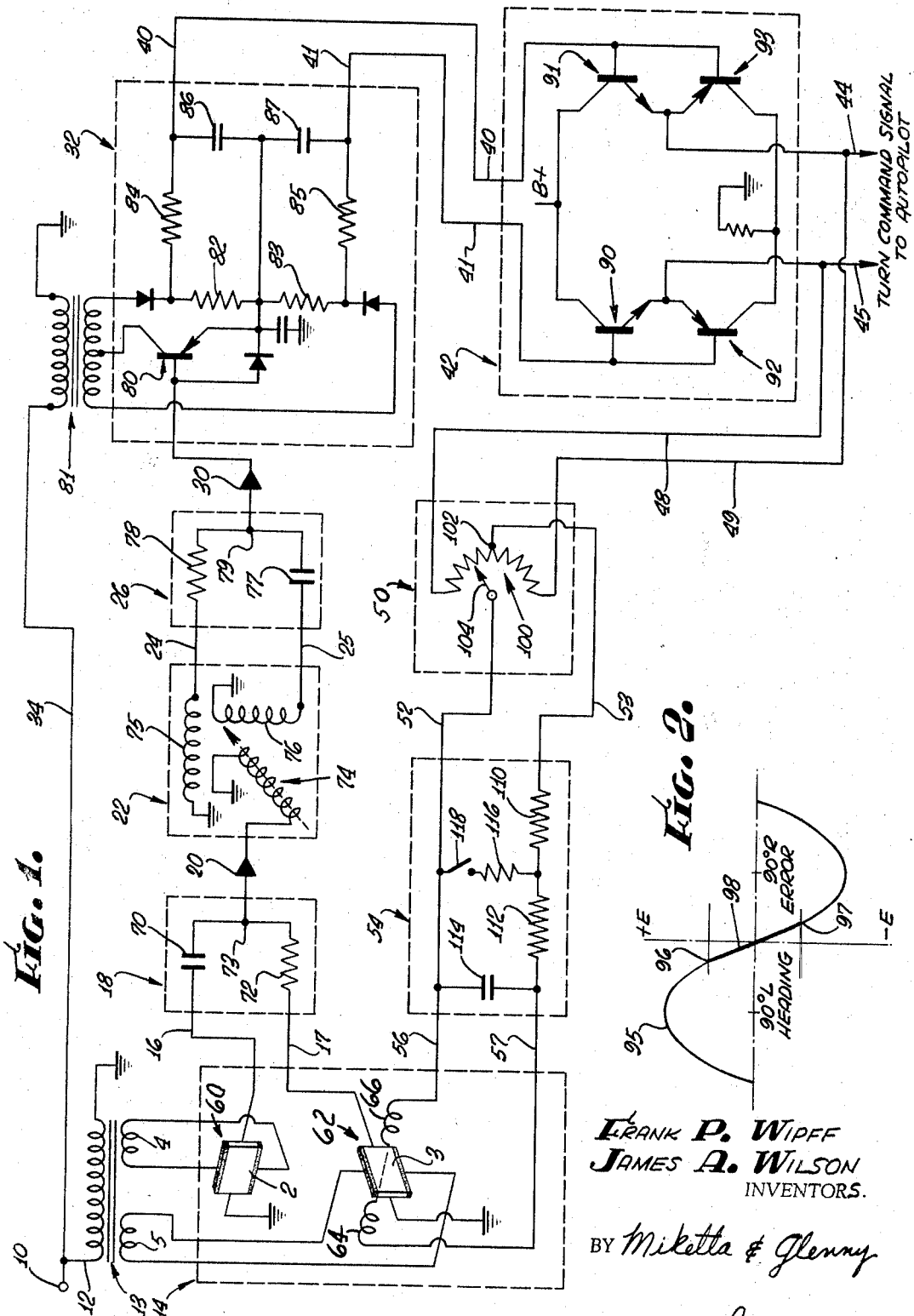

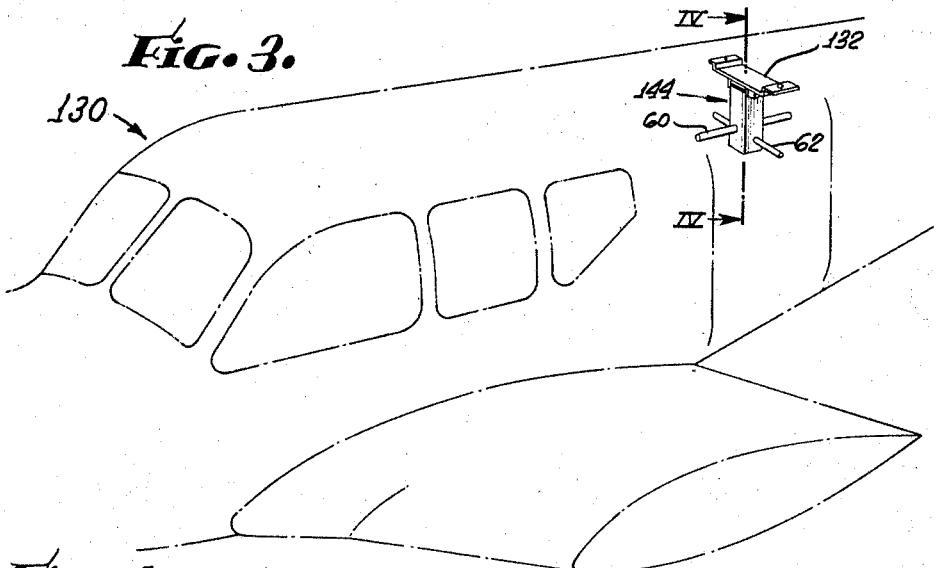
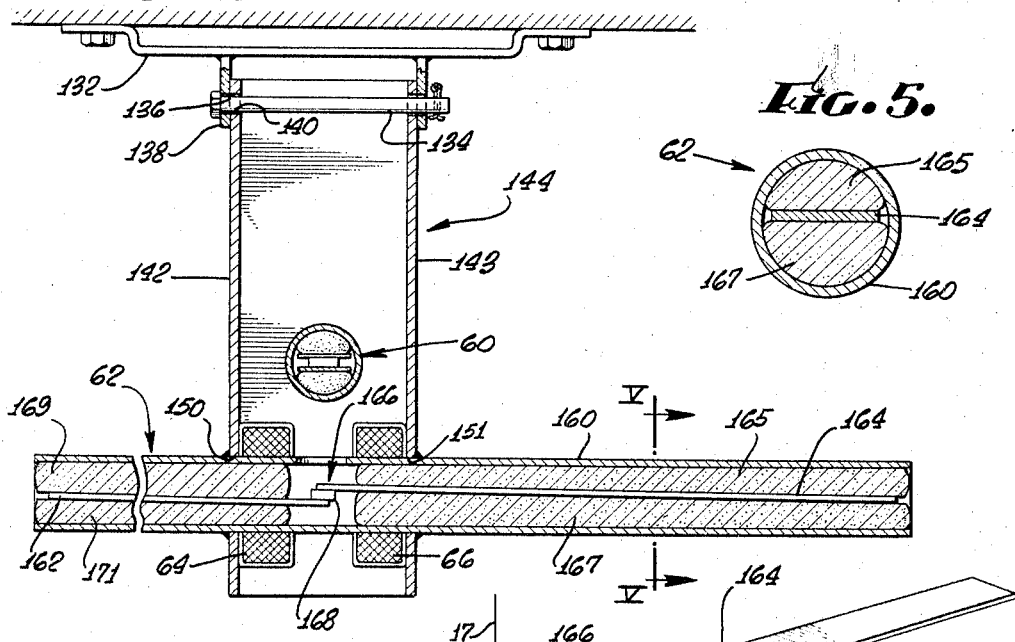
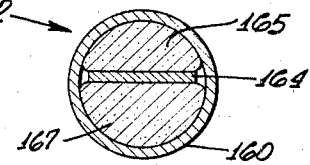
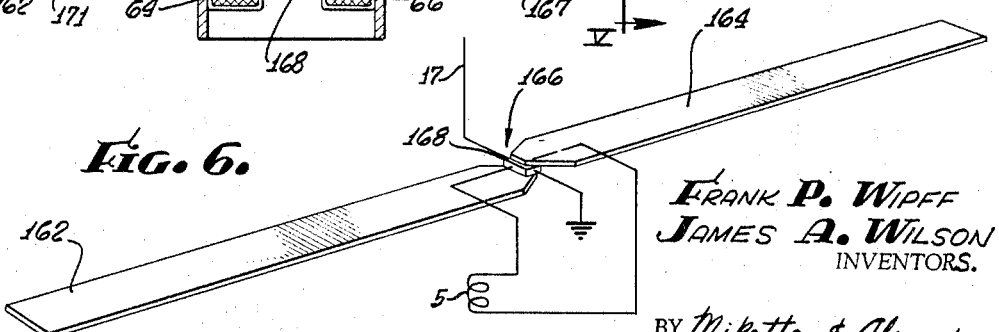
FRANK P. WIPFF
JAMES A. WILSON
INVENTORS.
BY Miketta & Glenny
ATTORNEYS.

3,425,648
AUTOPILOT MAGNETIC HEADING ERROR
CORRECTION SYSTEM
Frank Pershing Wipff and James A. Wilson, Prescott,
Ariz., assignors to Airborne Navigation Corporation,
Prescott, Ariz., a corporation of Arizona
Continuation of application Ser. No. 366,752, May 12,
1964. This application Sept. 20, 1966, Ser. No. 580,831
U.S. Cl. 244—77                                       19 Claims
Int. Cl. B64c 13/50

ABSTRACT OF THE DISCLOSURE

An aircraft magnetic heading information generating system for correcting the error otherwise existing during banking caused by the inclination of the earth's magnetic field, comprising a sensing array for sensing the earth's magnetic field in two angularly related directions including the component parallel to the aircraft lateral axis, circuitry for deriving from the output of the sensing array a signal carrying intelligence as to magnetic heading, producing an error signal in commanding a selected turn, deriving therefrom a command signal having a limited maximum value corresponding to a preselected maximum permitted bank or rate of turn of the aircraft, using a portion of the command signal of selected magnitude and polarity of a raw compensating signal, effectively combining the compensating signal with the output of the sensing array, preferably by generating a compensating flux to be sensed by the sensor responsive to the component of the earth's field parallel to the aircraft lateral axis, and time delay circuitry for refining the raw compensating signal for simulating the effect of aircraft roll attitude during transition between bank and level flight.

---

This application is a continuation of S.N. 366,752 filed May 12, 1964, now abandoned.

The present invention relates generally to autopilots for aircraft wherein heading information is derived from the earth's magnetic field, and more particularly is directed to a system for correcting the northerly turning error otherwise introduced during a banking movement of the aircraft by reason of the inclination or dip of the earth's magnetic field. For simplicity of explanation, this description will assume that the magnetic dip is downwardly toward north, as exists generally in the northern hemisphere. It will be seen, however, that the invention is applicable for use where the dip is downwardly toward south, as is generally the case in the southern hemisphere, and at selected latitudes, by controlling the polarity and strength of the compensating electric signal in the manner indicated.

In general the invention contemplates, in an autopilot system carried by an aircraft, the provision of flux sensors for sensing the strength of the earth's magnetic field in a plurality of directions related to the heading and attitude of the aircraft. For example, one sensor may sense flux parallel to the aircraft heading, and another sensor may sense flux having a component parallel to the aircraft lateral axis. When such axis is other than horizontal, as during a turning movement of the aircraft incident to a heading change, the flux sensed by the latter sensor will include part of the vertical component of the earth's field, thus introducing an error in the heading information supplied to the autopilot. Unless the error is corrected, the feedback around the entire loop is regenerative when turning to a commanded northerly heading, and the aircraft will consequently behave in the manner of an underdamped system, overshooting the commanded heading and oscillatorily hunting thereabout. Conversely, the feedback is degenerative when a southerly heading is commanded, and the aircraft will behave in the sluggish manner of an overdamped system.

It is a primary object of the present invention to provide novel means and circuitry by which to prevent regeneration in the feedback loop by generating a compensating or correcting signal during a turning movement of the aircraft, and applying such compensating signal to the loop in an inverse feedback manner. It may be noted that regeneration is more objectionable than degeneration in operation. Because of this fact, and because the unpredictable variables of aircraft operation prevent absolutely exact correction, the present invention contemplates a slight overcorrection of the northerly turning error in order to surely prevent regeneration. Since correction in accordance with the system is basically symmetrical, this would risk creation of regeneration when turning to a commanded southerly heading, and means are accordingly provided by which to decrease the magnitude of the compensating signal under those conditions.

In accordance with a preferred form of the present invention hereinafter illustrated and described in detail, the compensating signal of the invention is caused to produce a compensating magnetic flux to be sensed by the sensor means responsive to the earth's magnetic field parallel to the aircraft lateral axis. The compensating flux has a magnitude which is instantaneously correlated to that portion of the vertical component of the earth's field which is being sensed, and a polarity opposite thereto. Ideally the magnitude of the compensating flux should be exactly equal to the sensed vertical component portion; but practically, as discussed above, the magnitude is only substantially equal thereto, being slightly greater where regeneration is being compensated, and slightly less where degeneration is being compensated.

Thus in straight and level flight the compensating signal is zero. As the aircraft banks into a commanded turn, the signal rises in the appropriate polarity in substantial timed relation with the change of roll attitude, reaching maximum amplitude when the aircraft reaches its maximum bank as determined by conventional autopilot means such as a rate gyro controlling rate of turn at the cruising speed of the aircraft. Similarly, during recovery from the bank at the completion of the turn, the compensating signal decays to zero in timed relation with the physical recovery of the aircraft to straight and level flight.

In a preferred embodiment for the practice of the invention hereinafter illustrated and described in detail, a magnetic sensor array includes a pair of sensor assemblies so constructed and disposed relative to one another as to measure the intensity of the earth's magnetic flux in two mutually perpendicular directions. The sensor array is carried in a housing frame, which is desirably mounted on the aircraft for pendulous suspension about an axis transverse to the longitudinal axis of the aircraft. The two sensor assemblies of the sensor array are mounted so that, during straight and level flight of the aircraft, both sensor assemblies are disposed in horizontal planes slightly spaced apart, with one such sensor assembly, which may be referred to as the longitudinal sensor assembly, being oriented parallel to the longitudinal axis of the aircraft and the other sensor assembly, referred to herein as the lateral sensor assembly, being oriented with its axis normal thereto, and parallel to the pendulous axis previously mentioned.

By reason of the above described pendulous mounting, changes of aircraft attitude in pitch do not affect the orientation of the sensor array relative to the earth's magnetic field, but changes in roll do affect the orientation of the lateral sensor assembly relative to that field.

The magnetic sensors may be of any suitable type capable of producing an output signal having a characteristic proportional to the strength of the magnetic field sensed. Sensors of the Hall effect type are herein shown as exemplary and preferred, such sensors being excited by an input AC voltage and input flux and producing an output signal having a frequency of the input voltage and a magnitude proportional to the magnetic field strength.

Accordingly, it is a principal object of the invention to disclose and provide novel means for compensating for magnetic dip in a system using magnetically derived heading information in an aircraft or the like. Other objects are to provide means for generating a signal instantaneously compensating for magnetic dip in an aircraft of known banking characteristics; to provide means for generating a magnetic flux derived from said signal to either buck or reinforce the earth's magnetic field being sensed; and for other and additional objects and purposes as will be understood from a study of the following description of an exemplary preferred embodiment thereof taken in connection with the accompanying drawings in which:

FIG. 1 is a schematic block diagram of the major components of a system embodying the present invention.

FIG. 2 is a diagram showing the derivation of the compensating signal.

FIG. 3 is a fragmentary perspective view of an aircraft having a sensor array in accordance with the invention pendulously suspended therein.

FIG. 4 is a sectional view, on an enlarged scale, on line IV—IV of FIG. 3.

FIG. 5 is a sectional view on line V—V of FIG. 4.

FIG. 6 is a perspective view of a portion of one sensor assembly including a pair of flux concentrators and a sensing element.

Referring now in detail to the drawings, the circuit will first be described by reference to the major components thereof shown in the broken line blocks. A source of alternating current power (not shown) supplies power to input terminal 10, the power being desirably of 400 cycle frequency, as is customary in aircraft electrical circuits. From input 10, power is fed through line 12 and transformer 13 to a heading sensor array indicated generally at 14 including means to be described in detail later for producing two alternating current output signals in lines 16 and 17. The amplitudes of these signals include intelligence as to the magnetic heading of the aircraft in which the array 14 is mounted. The signals are fed into a phase shifter and combiner indicated generally at 18, which feeds an output signal to an automatic gain control amplifier 20. This signal is of 400 cycle frequency, and has a phase displacement from the reference voltage at input terminal 10 which is a measure of the aircraft's magnetic heading. The amplified, constant amplitude signal is fed to a heading selector or resolver indicated generally at 22. The selector permits the pilot operator to mechanically command a change in heading, and the difference between the new heading thus commanded and the magnetic heading being sensed by the sensor array 14 is reflected in the output signals of the selector appearing in lines 24 and 25.

The signals thus produced are fed to a phase shifter and combiner indicated generally at 26, which produces an output signal fed to amplifier 30 and thence to a phase discriminator indicated generally at 32. This signal is an alternating current signal displaced from the reference signal at input terminal 10 by a phase angle which is a measure of the angular difference between the magnetic heading indicated by the array 14 and the magnetic heading commanded by the selector 22. Reference voltage from input terminal 10 is fed through line 34 to the phase discriminator 32, which produces an output signal in lines 40 and 41 in the form of a DC voltage having an amplitude and polarity related to the magnitude and direction of the angular difference just mentioned. This signal is fed to an output limited DC amplifier indicated generally at 42, and is there amplified substantially linearly up to a limiting output value corresponding to an angular difference of a selected maximum value, for example 30°. The amplified and so limited signal in lines 44 and 45 constitutes a turn command signal for an autopilot, including means well known in the art for effectively limiting the inclination of the aircraft lateral axis during a commanded turn, such limiting means corresponding functionally to the limited signal output of amplifier 42. The inclination limiting means may take the form, for example, of a rate gyro sensitive to rate of turn of the aircraft, as in Clarkson Patent 3,006,580, such rate of turn for a given aircraft and cruising speed determining the maximum roll angle.

The amplified and limited signal from amplifier 42 is also fed through lines 48 and 49 to a latitude selector indicated generally at 50 and therefrom through lines 52 and 53 to a turning error correction network indicated generally at 54. The output of the latter network is fed through lines 56 and 57 to the array 14.

More specifically, and with further reference to FIG. 1, the heading sensor array 14 includes a pair of sensor assemblies indicated generally at 60 and 62, including magnetic sensor elements 2 and 3 respectively. These elements are here shown as Hall generators excited by input electric signals from secondaries 4 and 5 respectively, and producing signals in their respective output leads 16 and 17 which are functions of the input electric signals and of the magnetic flux passing perpendicular to the electrical field created by the electric signals. The two sensor elements 2 and 3 are disposed in space quadrature as indicated and, as will be understood later in connection with FIGS. 3 and 4, the sensor assembly 60 senses flux parallel to the aircraft heading, and sensor assembly 62 senses flux parallel to the aircraft lateral axis; they may be referred to as longitudinal and lateral sensor assemblies respectively. The two assemblies are mounted in the aircraft so that, in straight and level flight, they are in horizontal planes spaced apart only as required by their physical construction. It will be noted that sensor element 3 senses magnetic flux of the earth's field as well as flux generated by current in coils 64 and 66, the latter constituting the compensating flux in accordance with this embodiment of the invention. Sensor element 2 senses only the earth's magnetic field.

In phase shifter 18 the current in line 16 is shifted 90° in phase by capacitor 70, while the current in line 17 is fed through resistor 72, the two currents, now 90° displaced in phase, being combined at junction 73. It may be noted that the resistance of resistor 72 is equal to the reactance of capacitor 70 at 400 cycles, and the phase displacement of the combined signal at point 73 from the reference signal at input terminal 10 is a measure of the magnetic heading of the aircraft.

The amplitude of the signal at 73 is virtually constant with change of aircraft magnetic heading, but may vary somewhat with temperature change of the magnetic sensors as well as with the absolute value of the earth's magnetic field. This signal is accordingly fed through automatic gain control amplifier 20, the output signal being of constant amplitude and being fed to a rotor coil indicated generally at 74 in the resolver 22. Resolver 22 includes two stator coils 75 and 76 disposed in space quadrature, the position of rotor 74 being adjustable manually by the pilot operator in order to command a change of heading. The output currents of the two stator coils 75 and 76, appearing in lines 24 and 25 respectively, are fed to the phase shifter 26, wherein the phase of the signal in line 25 is shifted 90° by capacitor 77. The phase of the signal from stator coil 75 is unchanged as the signal passes through resistor 78, whose resistance is equal to the reactance of capacitor 90. The resultant signals are combined at junction 79 and are amplified in amplifier 30. The signal thus amplified is displaced in phase from the reference signal at input terminal 10 by an amount and in a direction which are a measure of the angle from the aircraft's magnetic heading to the magnetic heading commanded by the rotation of the rotor 74 of the heading selector 22.

In phase discriminator 32, the input signal is applied to the base of transistor 80, and reference voltage from line 34 is applied through the centertapped secondary of transformer 81. When the incoming signal is 90° out of phase with the reference voltage, no voltage is developed across load resistors 82 and 83. As the incoming signal shifts in phase, a rectified AC signal appears across the resistors, which is the cosine function of the difference in phase, or the sine function of the commanded heading change. The rectified signal is filtered by the network including resistors 84, 85 and capacitors 86, 87 and fed through output lines 40 and 41 to DC amplifier 42.

Transistors 90, 91, 92 and 93 in amplifier 42 are arranged in a bridge circuit with the output signal taken from the emitters, as shown, in order to limit the output voltage between predetermined limits and to provide sufficient current gain to drive the autopilot proper and the networks 50 and 54 in accordance with the invention. As previously mentioned, the input signal to amplifier 42 is a sine function of the commanded heading change or heading error, and if amplified without limiting the output voltage, the sine wave 95 of FIG. 2 would be produced. Limitation of the output between the voltage levels 96 and 97 provides an output voltage 98. The limits 96 and 97 correspond to a signal substantially equal to that needed to command the autopilot to make a turn of maximum bank, and the circuit components are chosen so that the limits 96 and 97 correspond to a heading error of approximately 30°. The output signal amplitude varies fairly closely to linearly with heading error within that range.

The output signal so amplified and limited as to magnitude, in addition to commanding the autopilot to produce a banking turn, is also fed through lines 48 and 49 to the latitude selector 50, including means for providing a portion of said limited signal of selected magnitude and polarity for use in the remainder of the system. As schematically shown, the current is fed through a potentiometer indicated generally at 100 having a centertap 102 connected to line 53 and a wiper 104 connected to line 52. Thus, for flying conditions at or near the magnetic equator, where the vertical component of the earth's magnetic field is virtually zero, no correction in accordance with the present invention is needed. Accordingly the pilot places the latitude selector wiper 104 at the center point of the potentiometer 100. When flying in the northern hemisphere, the pilot uses one half, such as the upper half, of the potentiometer, picking off a greater portion of the signal, the greater the magnetic dip; and similarly in the southern hemisphere, using the other portion of the potentiometer. Flying charts give the magnitude and direction of the magnetic dip for any location on earth.

Means are provided for producing an electrical signal in the form of a DC current having an instantaneous amplitude correlated to the roll attitude of the aircraft. Keeping in mind the fact that an aircraft does not instantaneously roll from straight and level flight into its maximum bank for a commanded turn, and does not instantaneously recover therefrom when the turn is completed, in order to correct for magnetic dip it is desirable to create a compensating signal whose instantaneous value is the analog, in the proper polarity, of the effect of the earth's magnetic field inclination resulting from the response of the aircraft to such command. Network 54 accomplishes this, including resistors 110 and 112 and capacitor 114. It will be understood that values of these components can be selected to reproduce, in output lines 56 and 57, a direct current having a magnitude virtually exactly instantaneously proportional to the angular bank of the aircraft.

In network 54 an additional resistor 116 may be provided for selective shunting across the lines by closure of switch 118. Switch 118 may be closed when a southerly heading is commanded by selector 22 in order to diminish somewhat the amplitudes of correction current fed through lines 56, 57 to compensating flux generating means 64, 66, and thereby prevent any possibility that the correction might give rise to underdamping of the aircraft seeking a southerly heading and consequent overshooting and oscillatory hunting, all as discussed above.

The preferred mounting of the sensor array in accordance with the present invention will be understood by reference to FIG. 3. As there shown, an aircraft is fragmentarily generally indicated at 130 and has fixed thereto a support bracket, preferably in the rear portion of the aircraft in order that the sensor array may be located relatively distant from an environment which would adversely affect the accuracy of the sensings of the array. As previously noted, the array 14 is desirably mounted in pendulous relation to the aircraft, here shown as including means for pivotal suspension about an axis parallel to the aircraft lateral axis. Thus, as best seen in FIG. 4, the array is suspended from a pivot support rod 134 extending through openings 136 in downwardly turned ears 138 from bracket 132, the rod 134 extending through registering openings 140 in the side walls 142 and 143 of a housing indicated generally at 144 in which the sensor assemblies are mounted.

In the lower portion of housing 144, the longitudinal sensor assembly 60 and the lateral sensor assembly 62 are mounted. Each of the assemblies extends through openings in the side walls of the housing 144, the openings for the lateral sensor assembly being indicated at 150 in wall 142 and 151 in wall 143. Coil means 64 and 66, previously referred to in connection with the schematic showing of FIG. 1, are mounted upon the sensor assembly 62, the electrical connections for such coils being omitted in the showing of FIG. 4 for clarity of presentation. It will be understood that the longitudinal sensor assembly 60 is identical to the lateral assembly 62, except that no coil means such as 64, 66 are included in the longitudinal assembly 60.

Means are provided within each of the sensor assemblies 60, 62 for concentrating the magnetic flux in a direction parallel to the axis of those assemblies. Thus, with specific reference to lateral assembly 62, such assembly includes a generally tubular housing 160 of non-magnetic material such as aluminum, having mounted therein a pair of flux concentrator elements 162 and 164, each of said elements extending from adjacent one end of the tube 160 to the central portion of the tube. In the central portion, indicated generally at 166, the sensing element 168, which includes the sensor 3 proper shown in FIG. 1, is mounted between the innermost ends of the flux concentrators 162 and 164, the latter elements overlapping longitudinally somewhat as indicated in order to maximize flux flow through the element 168. The flux concentrators 162 and 164 are here exemplarily shown as of strip form (see FIG. 6), and are made of a material of high permeability. The strips may be resiliently supported within tubular housing 160 as by rubber or equivalent material to minimize vibration damage to the concentrators and to the sensing element 168, such material being indicated at 165, 167, 169 and 171.

Accordingly it will be seen that the present invention provides means for producing a correction or compensating signal having an instantaneous value substantially that of the vertical component of the earth's magnetic field sensed by a magnetic sensor affected by roll attitude of a banking aircraft. It is recognized that certain approximations may be relied upon in generating the compensating signal, but the approximations do not adversely affect the underlying concept of preventing regenerative feedback otherwise resulting from northerly turning error. For example, it is assumed, as pointed out in connection with FIG. 2, that an angle and its sine can be assumed to be equal. Obviously this relationship does not hold for large angles, and is not strictly true even for small angles, but it is sufficiently accurate for present purposes, and it is more nearly exact at small angles, so that entrance into and recovery from a turn are smoothly accomplished in accordance with the present teaching.

Modifications and changes from the illustrative embodiment of the invention above described and illustrated are contemplated within the scope of the appended claims.

We claim:

1. In an autopilot system in an aircraft whose roll attitude changes in changing heading, in combination:
    a single magnetic sensing array for supplying heading information to an autopilot, including a sensor sensing the component of the earth's magnetic field parallel to the aircraft lateral axis;
    means independent of the earth's magnetic field for producing a compensating signal having a magnitude proportional to the vertical component of the earth's field sensed and a polarity correlated to the direction of roll attitude from the horizontal;
    and means energized by said compensating signal for correcting the error otherwise existing in the heading information during roll caused by the inclination of the earth's magnetic field.

2. The invention as stated in claim 1 wherein said signal producing means includes delay circuitry having a time constant approximating that of the aircraft during roll attitude changes commanded by the autopilot.

3. The invention as stated in claim 1 wherein said correcting means includes means for generating magnetic flux sensed by said sensor.

4. The invention as stated in claim 3 wherein said sensor is pendulously suspended in the aircraft.

5. The invention as stated in claim 3 wherein said flux is equal and opposite to the sensed portion of the vertical component of the earth's field.

6. In an aircraft autopilot, in combination:
    means for sensing the earth's magnetic field including the component thereof parallel to the aircraft lateral axis and compensating magnetic flux hereinafter defined, and producing therefrom a first signal carrying intelligence as to aircraft actual magnetic heading;
    heading selector means for producing a second signal carrying intelligence as to a selected magnetic heading;
    means for comparing said signals and producing an error signal, said error signal having a polarity correlated to the direction of the angle from the actual heading to the selected heading and having a value generally varying with the magnitude of said angle when the angle when the angle is less than 90°;
    means for producing an autopilot banking turn command signal of the same polarity as the error signal and carrying linearly therewith from zero to a limiting absolute value;
    and means for selecting a portion of said command signal and generating therefrom, in an inverse feedback manner, compensating magnetic flux to be sensed by the first named sensing means, said flux being substantially equal in magnitude and opposite in polarity to the vertical portion of said component of the earth's field.

7. The invention as stated in claim 6 wherein said sensing means includes longitudinal sensor means for sensing the earth's field parallel to the aircraft heading and lateral sensor means for sensing the earth's field parallel to the aircraft lateral axis and said compensing flux.

8. The invention as stated in claim 7 wherein the sensing means is pendulously mounted in the aircraft.

9. A magnetic heading erro correction system for use in an aircraft whose roll attitude changes in changing heading under the control of an autopilot, roll attitude change being limited by the autopilot to a maximum permitted bank angle, comprising:
    magnetic sensing means for producing information as to aircraft actual magnetic heading, including a sensor for producing a first signal, the sensor being responsive to the strength of the earth's magnetic field parallel to the aircraft lateral axis;
    means receiving said information and generating an error signal, said error signal varying generally with the angle between said actual heading and a selected heading when said angle is less than 90°;
    means receiving said error signal and generating therefrom an autopilot turn command signal varying with the error signal up to a maximum absolute value substantially equal to that needed to command a turn of maximum bank;
    means for producing a compensating signal proportional to the command signal, constituting a portion of the command signal of selected polarity and magnitude;
    and means for effectively combining the compensating signal and said first signal.

10. The invention as stated in claim 9 wherein said error signal is the sine function of the angle between said actual and selected headings.

11. The invention as stated in claim 9 including means energized by the compensating signal for generating flux to be sensed by said sensor.

12. The invention as stated in claim 9 wherein said maximum absolute value corresponds to a heading error of about 30°.

13. The invention as stated in claim 9 wherein said combining means includes delay circuitry having a time constant approximating that of the aircraft during roll changes commanded by the autopilot.

14. In a system for producing magnetic heading information in an aircraft, in combination:
    a single magnetic sensing array including a sensor sensing the component of the earth's magnetic field parallel to the aircraft lateral axis;
    means independent of the earth's magnetic field for producing a compensating signal having a magnitude proportional to the vertical component of the earth's field sensed and a polarity correlated to the direction of roll attitude from the horizontal;
    and means energized by said compensating signal for correcting the error otherwise existing in the heading information during roll caused by the inclination of the earth's magnetic field.

15. The invention as stated in claim 14 wherein said correcting means includes means for generating magnetic flux sensed by said sensor.

16. The invention as stated in claim 15 wherein said sensor is pendulously suspended in the aircraft.

17. The invention as stated in claim 15 wherein said flux is equal and opposite to the sensed portion of the vertical component of the earth's field.

18. In a system for producing magnetic heading information in an aircraft, corrected for the error otherwise existing when the aircraft lateral axis is displaced from the horizontal, such error resulting from the inclination of the earth's magnetic field, and comprising a single magnetic sensing array including a sensor sensing the component of the earth's magnetic field parallel to the aircraft lateral axis and means energized by a compensing signal hereinafter defined for correcting said error, the provision of:
    means independent of the earth's magnetic field for producing a compensating signal having a magnitude proportional to the vertical component of the earth's field sensed and a polarity correlated to the direction of roll attitude from the horizontal.

19. In a system for producing magnetic heading information in an aircraft, corrected for the error otherwise existing when the aircraft lateral axis is displaced from the horizontal, such error resulting from the inclination of the earth's magnetic field, and comprising a single magnetic sensing array including a sensor sensing the component of the earth's magnetic field parallel to the aircraft lateral axis, the provision of:

means independent of the earth's magnetic field for producing a compensating signal having a magnitude proportional to the vertical component of the earth's field sensed and a polarity correlated to the direction of roll attitude from the horizontal; and means energized by said compensating signal for correcting said error.

References Cited

UNITED STATES PATENTS

| | | | |
|---|---|---|---|
| 2,597,135 | 5/1952 | Stuart | 33—224 |
| 2,834,562 | 5/1958 | Jude et al. | 244—77 |

FERGUS S. MIDDLETON, *Primary Examiner.*

U.S. Cl. X.R.

324—43, 45; 33—204, 225